Sept. 18, 1951   J. J. HUGON   2,567,939
MEANS FOR DETECTING THE PRESENCE OF OBJECTS
BY MEANS OF ELECTROMAGNETIC WAVES
Filed Dec. 29, 1945   9 Sheets-Sheet 1

Inventor
JEAN JACQUES HUGON
By Haseltine, Lake & Co.
Attorneys

Sept. 18, 1951　　　　　　　J. J. HUGON　　　　　　　2,567,939
MEANS FOR DETECTING THE PRESENCE OF OBJECTS
BY MEANS OF ELECTROMAGNETIC WAVES
Filed Dec. 29, 1945　　　　　　　　　　　　　9 Sheets-Sheet 3

Inventor
JEAN JACQUES HUGON
By Haseltine, Lake & Co.
Attorneys

Sept. 18, 1951   J. J. HUGON   2,567,939
MEANS FOR DETECTING THE PRESENCE OF OBJECTS
BY MEANS OF ELECTROMAGNETIC WAVES
Filed Dec. 29, 1945   9 Sheets-Sheet 4

Inventor
JEAN JACQUES HUGON
By Haseltine, Lake & Co.
Attorneys

Sept. 18, 1951     J. J. HUGON     2,567,939
MEANS FOR DETECTING THE PRESENCE OF OBJECTS
BY MEANS OF ELECTROMAGNETIC WAVES
Filed Dec. 29, 1945     9 Sheets-Sheet 6

Inventor
JEAN JACQUES HUGON
By Haseltine, Lake & Co.
Attorneys

Sept. 18, 1951 J. J. HUGON 2,567,939
MEANS FOR DETECTING THE PRESENCE OF OBJECTS BY MEANS
OF ELECTROMAGNETIC WAVES
Filed Dec. 29, 1945 9 Sheets-Sheet 8

*Inventor*
*JEAN JACQUES HUGON*
By *Haseltine, Lake & Co.*
*Attorneys*

Sept. 18, 1951   J. J. HUGON   2,567,939
MEANS FOR DETECTING THE PRESENCE OF OBJECTS
BY MEANS OF ELECTROMAGNETIC WAVES
Filed Dec. 29, 1945   9 Sheets-Sheet 9

*Inventor*
JEAN JACQUES HUGON
By Haseltine, Lake & Co.
*Attorneys*

Patented Sept. 18, 1951

2,567,939

UNITED STATES PATENT OFFICE 2,567,939

MEANS FOR DETECTING THE PRESENCE OF OBJECTS BY MEANS OF ELECTROMAGNETIC WAVES

Jean Jacques Hugon, Paris, France, assignor to Compagnie Generale De Telegraphie Sans Fil, a corporation of France Application December 29, 1945, Serial No. 638,373
In France November 26, 1943

Section 1, Public Law 690, August 8, 1946
Patent expires November 26, 1963

12 Claims. (Cl. 343—10)

The present invention relates to a system for the location of objects by means of radio-electric impulses reflected by the objects and received on a cathode-ray oscilloscope, and more particularly to plan position indication whereby the same oscilloscope can indicate both the range and the bearing of the object.

One object of the invention is to provide an improved device for generating and rotating an exploring beam having a marked directional effect by means of rotary elements which are simple, light and of small size, requiring relatively little power for their rotation, and therefore suitable for rapid exploration of space and for locating very fast moving objects.

Another object is the supply to the rotary elements of ultra-high-frequency energy in very short pulses.

According to one feature of the invention, the beam-transmitting device, as also the echo-receiving device, comprises two parts, one of which is fixed and has the shape of a plurality of juxtaposed directional horns arranged as a crown or arc, while the other is movable and has the shape of a guide rotating inside the crown in a position where it sweeps across the small ends of the horns.

According to another feature of the invention, the elementary horns, forming the crown, and the rotating guide have a rectangular cross-section and a wave of the $TE_{01}$ type is fed thereto.

According to yet another feature of the invention, the end of the rotary guide adjacent the small ends of the horns is large enough to cover several elementary horns.

According to a still further feature of the invention, the device comprises two fixed crowns, respectively for transmission and reception, each combined with a rotary guide, both guides being rotated on a common shaft, one guide being fed with the exploring beam and the other being connected to the oscilloscope.

In the accompanying drawings:

Fig. 7 illustrates a rectangular cross-section horn, for example for transmitting the wave of the $TE_{01}$ type, while

Fig. 9 shows the fixed part of the radiating device according to the invention, while Fig. 10 is a diagrammatic view thereof together with the movable part for rotating the beam;

Figs. 11a and 11b show detail views of the movable part, while

Figure 1:
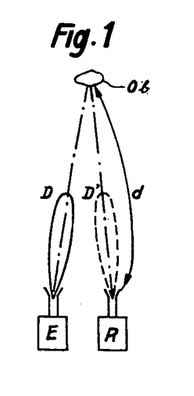
Figs. 1 to 6 illustrate the general principles of radar and more particularly of plan position indication.

Referring to the drawings,

Figure 1 illustrates an object Ob receiving an electromagnetic pulse from a directional transmitting aerial E which it reflects on to a receiving aerial R.

Figure 2:
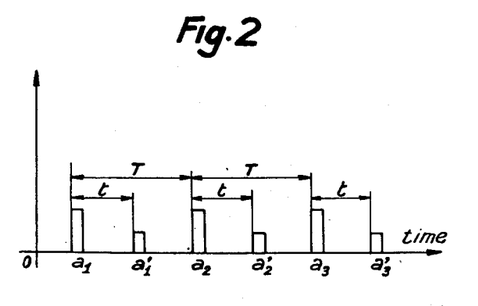
Figure 3:
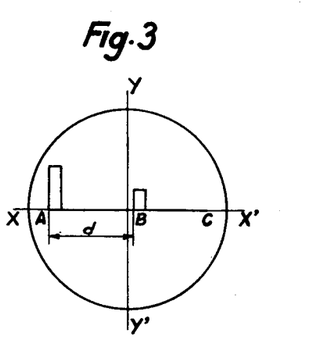

Figure 2 illustrates at $a_1$, $a_2$, $a_3$ etc. very brief transmission pulses, for example of a duration of 1 microsecond separated by intervals of T seconds from one another and at $a_1'$, $a_2'$, $a_3'$, etc. there are shown the echoes of the said pulses which reach the receiver R $t$ seconds after the signals $a_1$, $a_2$, $a_3$ etc. have been emitted. The distance $d$ from the object O to the detector R is such that $2d_{km} = t_{sec} \times 300{,}000$. The measurement of the time interval $t$ is generally obtained by employing a cathode ray tube scanned along its horizontal axis in synchronism with the emissions of pulses and of which the vertical deflecting plates are affected by the pulse amplified and detected by the receiver. The phase of the scanning is regulated so that the local echo or direct reception of the pulse on the receiver appears at A (Figure 3) at the start of the scanning; the echo of the pulse from the object appears at B and it is sufficient to effect the measurement of AB to obtain the distance desired.

As regards the azimuth, this is generally obtained by pointing aerials in the direction of the object until a maximum intensity of the echo is obtained. To detect an object located in a different azimuth, the whole of the aerial must be rotated until a maximum intensity of the new echo is obtained.

Figure 4:
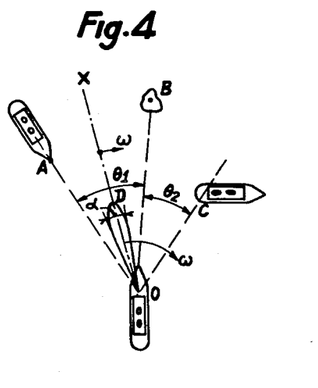

In the present invention, the necessity of continually exploring for the direction of the object is avoided by making the directive patterns of transmission and reception aerials giratory. The common axis OX (Figure 4) of the two patterns rotates at a high speed, for example $N=10$ to 100 revolutions per second, about O in the plane formed by the aerials and the object to be detected. The space lying within the said plane is thus literally swept by the directive Hertzian beam and the objects located in this plane are subjected to an electromagnetic exploration field many times per second and over a period proportional to the angular aperture $a$ of the Hertzian beam (Figure 4). The exploring plane is horizontal when the apparatus is intended to search for objects located at sea level (ships, icebergs, wrecks, coasts and the like). It may assume any inclination when the apparatus is intended for the electromagnetic detection of aeroplanes and airships.

Figure 5:
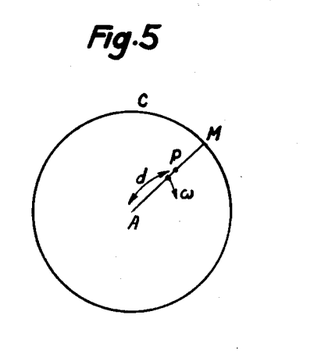
Figure 6:
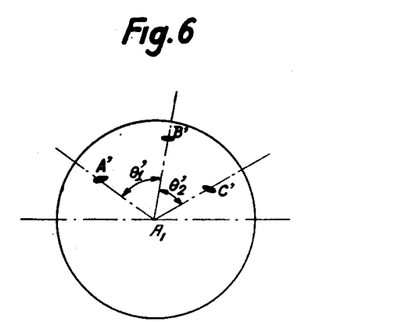

According to the invention and accompanying the rotating movement of the Hertzian beam, there is arranged a cathode ray tube on which is caused to appear a radial scanning mark directed from the centre A towards the periphery of the tube and limited by a circle C having its centre at A. The radius AM rotates about A at the same speed as the Hertzian beam and the frequency $$F = \frac{1}{T}$$

of the radial scanning according to AM is much greater than the number of revolutions per second of AM about A; for example, the scanning takes place at the frequency of 2000 revolutions per second, whereas the speed of exploration is only 10 to 100 revolutions per second. The start of the scanning located at the centre A of the cathode ray tube (Figure 5) is achieved by dephasing coincident with the transmission of the Hertzian pulse, whilst the echoes of the pulse appear on the radius AM at a distance AP from the centre A which corresponds to the distance $d$ of the aerials to the object. To cause the echo to appear on the cathode ray tube, the outlet of the receiving amplifier is connected on to the control grid of the tube in such manner that the outgoing pulse polarises the grid positively, whilst a permanent negative polarisation blurs the radial scanning AM. Owing to this fact, when an echo arrives at the reception aerial, a clear spot appears at P on the radial sweeping AM and this spot appears stationary, since the movement of rotation of AM is exactly synchronised with that of the patterns of the aerials. If there are a number of objects, such as A, B, C, in front of the apparatus, the spots A', B', C', appear on the cathode ray tube and the angles $\theta_1$ and $\theta_1'$ are equal, as also $\theta_2$ and $\theta_2'$ (Figures 4 and 6). There is thus obtained a true panoramic representation of the space in front of the aerials and there is no longer any need to worry about the exploration for the object, the latter being necessarily detected if it is situated in the angle of exploration of the aerials of the apparatus. This scanning method is known in the art as plane polar indication or P. P. I. radar.

Figure 7:
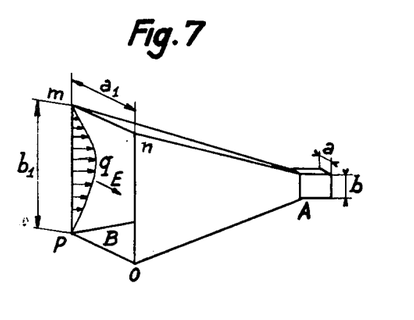
Figure 8:
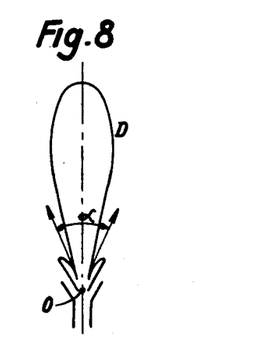
Fig. 8 shows the radiation pattern thereof.

There will now be described what, according to the present invention, are the methods and apparatus employed for obtaining a correct operation of the apparatus. The system can function by means of very short electromagnetic waves (for example of the order of a metre) or ultrashort waves (less than 0.20 m.) according to the types of aerials employed. The invention will be hereinafter described with reference to the field of ultra short wave frequencies the lower limit of which is of 1500 megacycles (0.20 m.) but it is to be understood that the invention is not limited to this field and the system is operable with frequencies less than 1500 megacycles where suitable aerials are employed. It is known that electromagnetic waves of very short wave length may be radiated by means of horns of rectangular section, an example of which is illustrated in Figure 7. The pyramidal horn shown in Figure 7 can transmit through its opening B an electromagnetic wave injected at A through a guide of rectangular section. The injected wave is, in the case of Figure 7, of the TE$_{01}$ type which necessitates for the conductor guide a dimension $b$ greater than $\lambda/2$, $\lambda$ being the wave length, whereas the dimension $a$ may be chosen as desired. In particular a dimension $a$ which is very small may be used without inconvenience and this pecularity is utilised in the invention. The electric field E in the guide is parallel to the short sides $a$ of the guide and is parallel to the sides $mn$ and $op$ of the aperture of the horn. The distribution in amplitude of the field E is sinusoidal according to the greater dimension $b$ of the guide and is presented along the surface $mp$ of the aperture of the horn by the half sinusoid $mqp$ (Figure 7). Figure 8 illustrates the pattern obtained in the horizontal plane. This pattern is all the more tapered the larger the radiating surface $a_1$, $b_1$.

Figures 9, 10:
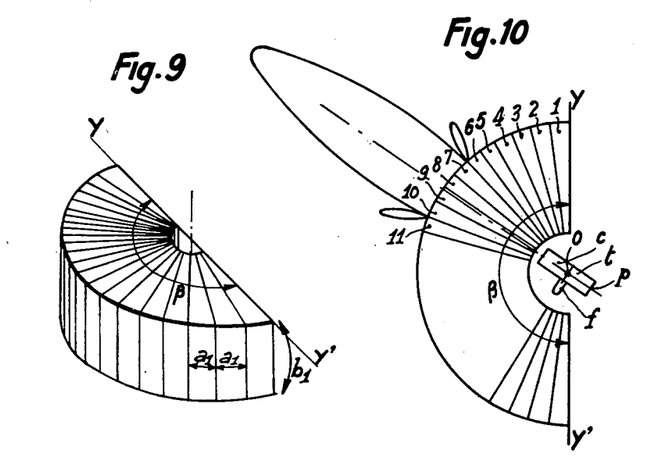

According to the present invention, the pattern D is made to rotate at a high speed about an axis extending through the point O of Figure 8 and perpendicular to the plane of Figure 8. This rotation, the object of which is to obtain a rapid sweeping of the whole space to be searched, takes place by coupling together a large number of horns identical to that illustrated in Figure 7 so as to form a single large horn divided into sectors as is represented in Figure 9. The dimension $a_1$ of the individual horns has been made small so that a large number of elements (for example 20 to 100) constitute the sectionally divided projector for an opening $\beta$ of 180°. The opening $\beta$ of the sectionally divided horn is fixed by the field of exploration which it is desired to give to the apparatus; it may be, for example, 180° for apparatus intended for commercial vessels, but it may attain 360° in apparatus for all azimuths intended for example for lightships or maritime lighthouses. The individual horns such as 1, 2, 3, etc. (Figure 10) are group-excited by a distributor in the form of a rectangular cavity C open at one extremity and terminated by an adjustable piston $p$ at the other end. This distributor which can rotate at a high speed about the axis O perpendicular to the plane of the figure, excites a certain number of horns located side by side, such for example as 7, 8, 9, 10 (Figures 10 and 11) and the result is the same as if a single horn, having an aperture equal to the sum of the aperture surfaces of the excited horns, were rotated at the speed of the distributor. The electromagnetic beam radiated therefrom has approximately the same shape as that which would be obtained by a single horn having an aperture equal to the sum of the apertures of the excited horns. This beam rotates about the axis O and sweeps the space located in front of the projectors at the same angular speed ω as that of the distributor.

Figure 11A:
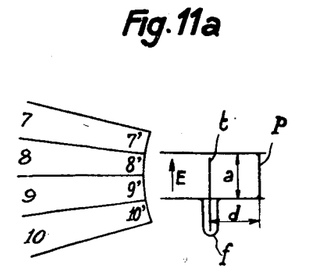

The distributor illustrated in Figure 11a is formed by a parallelepiped cavity closed by a piston p at one extremity and open at the other to permit the supply of the individual horns by their mouthpieces 7', 8', 9', 10', etc. The dimensions of the rectangular section of the distributor a and b are approximately those of the guide A which feeds the horn illustrated in Figure 7. The dimension b in particular is that over which the wave may propagate without attenuation, that is to say that it is larger than the half length of the wave to be radiated. The electric field is directed according to E (Figure 11a) and this field preserves its polarisation and its size on being transmitted to the mouthpieces 7', 8', 9', 10' of the individual horns.

The distributor is supplied with energy by a radiating element t parallel to the electric field and which extends into a tubular feeder f of suitable characteristic impedance. The position of piston p is adjustable relatively to the radiating element t, whereby p is subjected to an impedance approximately equal to the characteristic impedance of the feeder f.

Figure 11B:
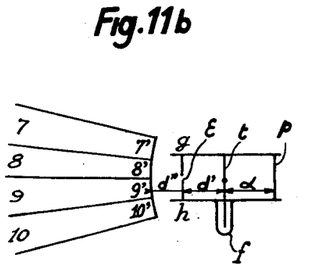

There may also be provided in the cavity a surface gh comprising a slot ε (Figure 11b) and located between the mouthpieces 7', 8', etc. of the individual horns and the radiating element t. By carefully regulating $d'$ and $d''$, as also the width of the slot ε, the slight reflection which the energy inevitably undergoes in passing from the cavity to the horns is completely annulled.

Figure 12:
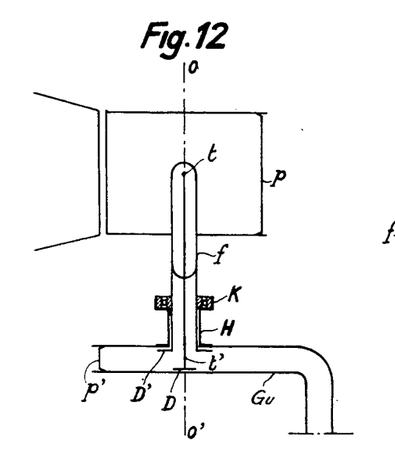
Figs. 12 and 13 show the movable part, the drive mechanism, and the means for supplying energy.
Figure 13:
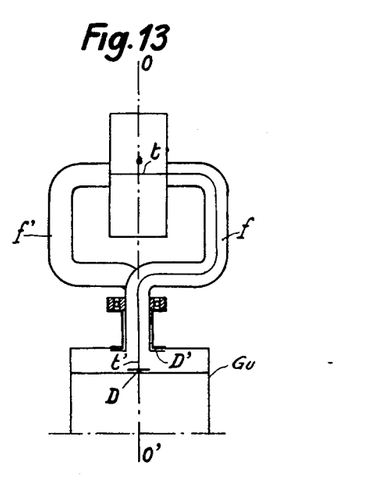

Figures 12 and 13 illustrate that the electromagnetic energy is transmitted from the guide of rectangular section Gu, connected to the transmitted, up to the distributor by the energy collector element t' which terminates the feeder f. The collector element t' is provided at its extremity with a copper disc D arranged very close to the lower surface of the guide Gu whilst the envelope tube of the feeder is itself terminated by a flat ring D' arranged very close to the upper surface of the guide Gu, so as to form a space or capacity. The disc D and the ring D' allow the feeder f to rotate without friction in the guide Gu whilst ensuring the passage of the ultra-high frequency currents, and the ball race K ensures the centring and the fixity of the system in a vertical direction. The piston p' which terminates the extremity of the guide Gu permits the collector element t' to be exactly adapted to the guide Gu. Figure 13 illustrates in front view the arrangement of the feeder f connecting the distributor to the guide and illustrates the dynamic counterweight f' which comprises a tube having approximately the same moment of inertia with respect to the axis OO' as the feeder f.

Figure 14:
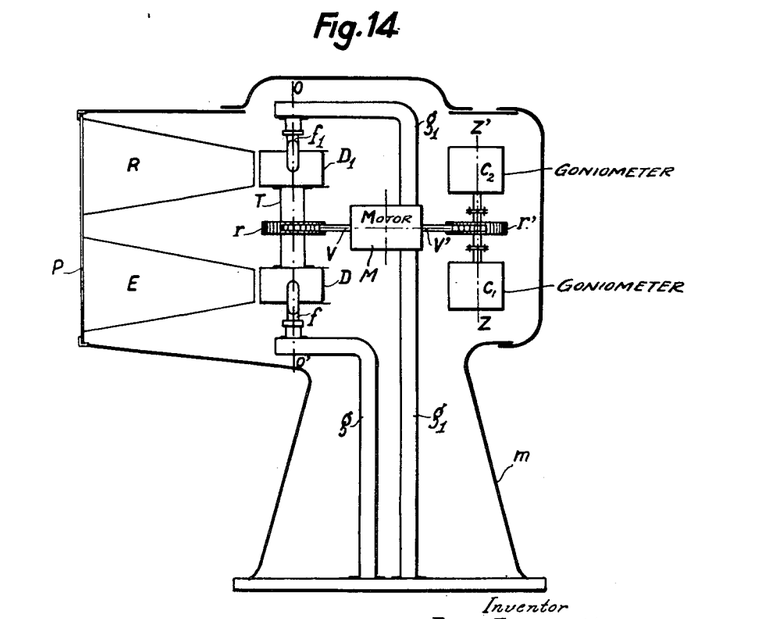
Fig. 14 is a view of a locating device including a scanning transmitter and a plan position receiver according to the invention.

The reception aerials are identical in every way to those for transmission and Figure 14 illustrates the appearance of a complete transmission and reception aerial. There is illustrated at M the motor which drives, at a constant speed, the two distributors D and D₁ through the intermediary of a wheel r and a drive V. The shaft T connects the two distributors D and D₁ which may be slightly displaced from one another when the Hertzian beams employed are very fine and when the speed of rotation is high. The wheel r', acted upon by the drive V' integral with the motor M drives two units contained in the chests or cases $C_1$ and $C_2$ the function of which will be hereinafter described. The units and the distributors D and D₁ rotate rapidly at the same speed which is the same as that of the scanning of the space to be explored by the Hertzian beam. The complete assembly may be located in an enclosure of cast metal m provided with inspection holes and watertight doors. In front of the transmission and reception horns there is located a protective shield P made of insulating material such for example as Pyrex glass, the shield comprising a seal against spray and fog but permeable to the Hertzian waves employed.

Figure 15:
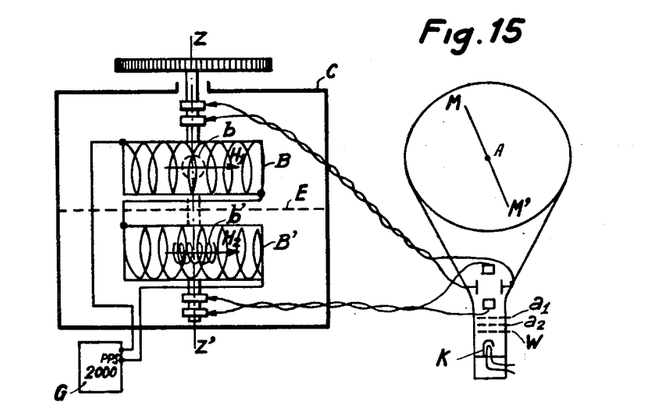
Figs. 15 to 18 illustrate radial and rotary scanning of a receiving oscilloscope according to my divisional application, Serial No. 240,882, filed August 8, 1951.

The fact that a rotating radial sweep, synchronised strictly with the movement of the distributors is obtained upon the oscillograph will be hereinafter described. The motor M which drives the distributors D and D₁ through an endless screw and the wheel r (Figure 14) also drives at the same speed a vertical shaft ZZ' through the wheel r' and the endless screw V'. In the casing or chest C through which the axis ZZ' extends there is arranged (Figure 15) what may be conveniently defined as a goniometer comprising two cylindrical coils B, B' with parallel axes and wound in an identical manner so as to give the same magnetic field. These coils which have nothing reciprocal between them are traversed at their centre by a shaft coaxial with the axis ZZ' which intersects their symmetrical axis perpendicularly. Arranged on the coaxial shaft are two small coils bb' fixed at 90° to one another and arranged concentrically to the coils B, B' the windings of which are supplied in series by a current from a musical frequency generator G which also supplies the transmitter (signal generation), the receiver and the measuring circuits. The frequency of the generator G is fixed; for example, 2000 periods per second in the example described, and for a range of the apparatus limited to 15 km.

Figure 16A:
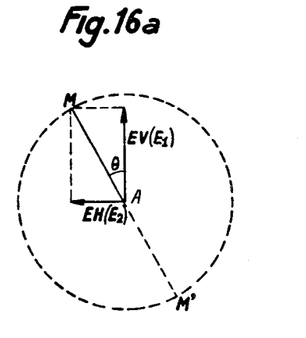

The magnetic fields $H_1$ and $H_2$ which are formed on the axis of B and B' are equal in amplitude and their phase agreement is exact, they are of the following form:

$$H_1 = H_2 = H \sin \omega t$$

being the pulsation of the current coming from G. The electromotive forces induced in the coils b and b' are, for a displacement of θ and $\pi/2 - \theta$ of their axes with respect to the axes of B and B':

$$E_1 = \omega NSH \cos \theta \cos \omega t$$

$$E_2 = \omega NSH \cos\left(\frac{\pi}{2} - \theta\right) \cos \omega t$$

$$= \omega NSH \sin \theta \cos \omega t$$

wherein N is the number of turns of coils b and b¹ and S the surface of one of said turns. If the difference of potential $E_1$ is applied to the two vertical deflecting plates of the cathode ray tube C and the difference of potential $E_2$ on the two horizontal deflecting plates of the same tube there is obtained (Figure 16a) on the screen a straight line MM' making with the vertical axis of deflection an angle θ exactly equal to the angle of the coils b and B. The spot receives on the straight line MM' a sinusoidal movement of $$x = AM \cos \omega t$$

Figure 16B:
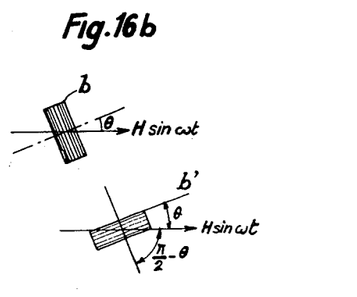
Figure 17:
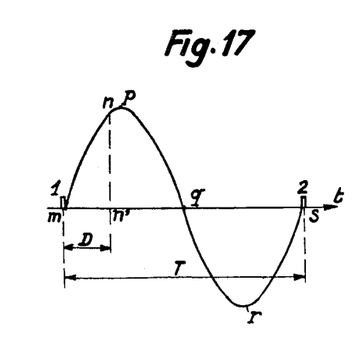

Figure 16b illustrates the relative arrangement of the induced coils b and b' in the H sin ωt field of the inducing coils BB'. There is thus produced a sinusoidal radial sweeping which is sufficient for practical needs since, as will be hereinafter explained, the measuring devices employed enable the exact distance to be obtained whatever may be the rule adapted for scanning. In Figure 17 is illustrated the developed sweeping; it is a sinusoid of equal period to that of the potential emanating from G; and the part $mp$ corresponds to AM on the cathode ray tube. This is the portion which is used and on which are caused to appear the echoes of the objects detected. At 1 and 2 are illustrated two transmitted pulses of a very short duration, for example 1 microsecond or less if the pass band of the receiver lends itself thereto; the phases are arranged in such manner that the local spot coming from the direct reaction of the transmitter on the receiver is at $m$, that is to say at the centre A of the cathode ray tube. The section of curve used to receive the echoes is $mn$ and the time $mn'$ represents for example ⅕ or ⅙ of the period T. If now the two coils $b$ and $b'$ are made to rotate at the same speed as the distributors D and D', the diameter MM' will rotate about A at the same speed as that of the shaft coaxial with the axis ZZ', that is to say as that of the distributors, and the echoes picked up by the receiver will be shown on the cathode ray tube in the manner illustrated in Figures 4 and 6.

Figure 18:
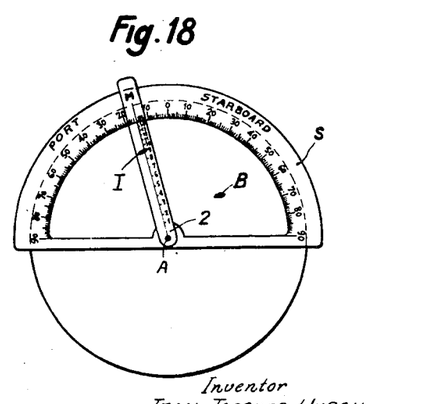

In order that the panoramic representation may not be deformed from the angular point of view, the potential acting on the pair of deflecting plates closest to the screen of the cathode ray tube is increased so that the position of M and M' is really a circle and not an ellipse. To carry out the measurement of distance and direction, there may be arranged on the cathode ray tube and in accordance with Figure 18, a transparent scale ruler I movable about the centre A of the radial scanning and graduated in distances; the direction may also be obtained by means of a graduated sector $s$ and by using the line AM of the scale of distances. To measure distance, the graduation must be taken which corresponds to the point of the spot closest to the centre A, whilst the measurement of the direction takes place by causing the line AM to coincide with the centre of the luminous spot.

Figure 19:
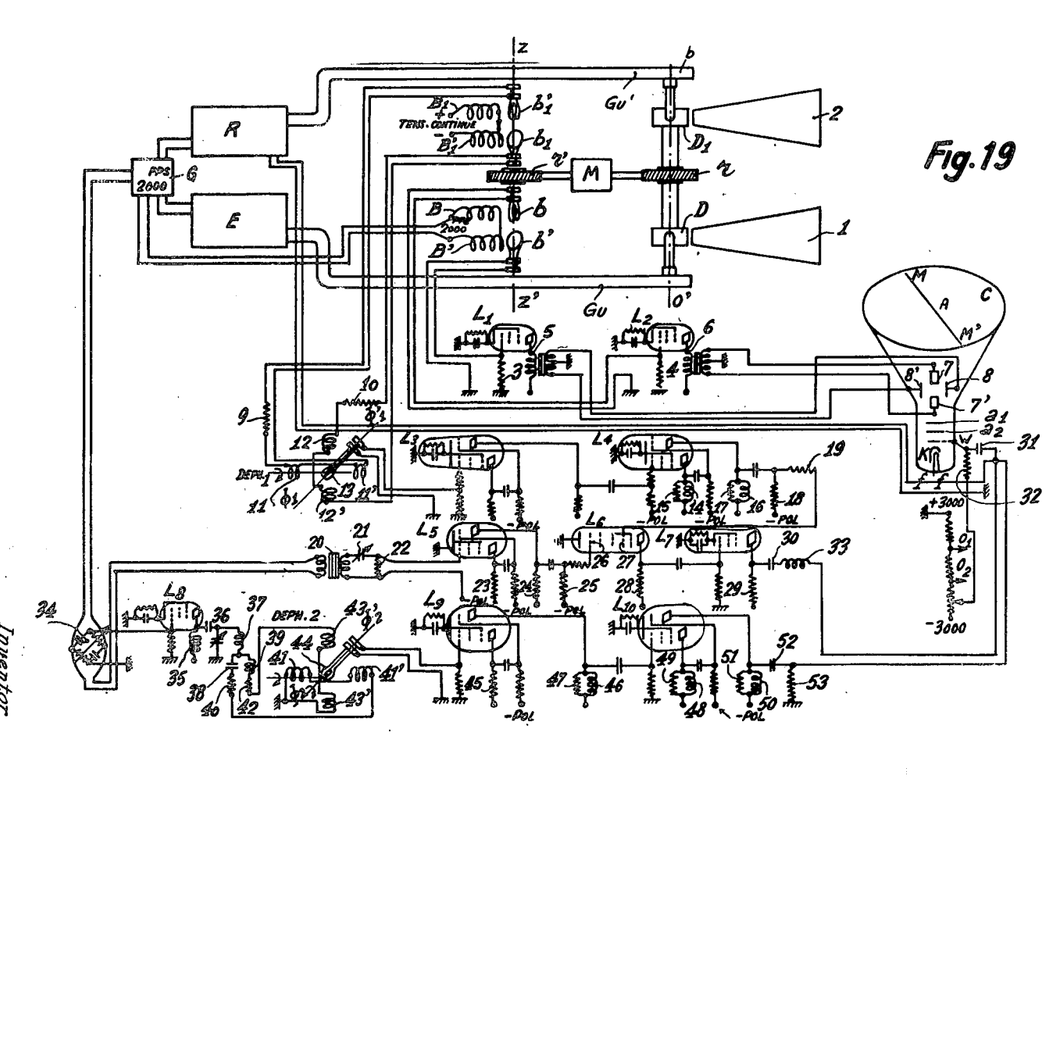
Fig. 19 is a complete wiring diagram of a plan position indicator comprising the transmitter and the receiver.
Figure 20A:
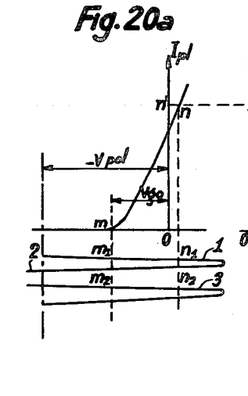
Figs. 20 to 28 indicate how to obtain bearing and range readings according to my divisional application, Serial No. 240,881, filed August 8, 1951.
Figure 20B:
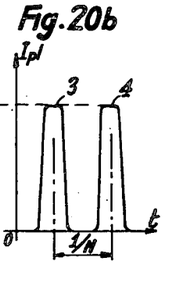
Figure 21:
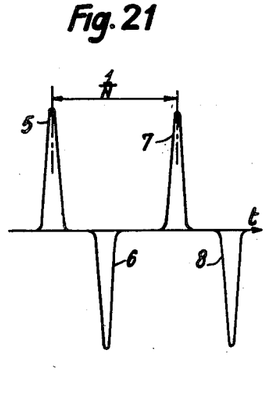
Figure 22:
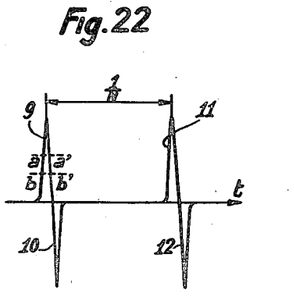

It is also possible according to a modification of the invention, to cause the appearance on a fluorescent screen of luminous lines which replace the sector and scale rule. There is then used a group of circuits which are illustrated on the general diagram of the panoramic detector (Figure 19). Referring to Figure 19 there is illustrated in section the directional transmission aerial 1 and reception aerial 2, the two distributors D and D₁ transmission and reception guides $Gu$ and $Gu'$, a motor M driving the distributors D and D₁ through the shaft OO' and goniometer carried by a shaft coaxial with the axis ZZ'. In addition there is illustrated the ultra-high frequency transmitter E emitting pulses of very short duration; the super heterodyne receiver R of ultra-high frequency with its medium frequency, detector and low frequency stages; the generator of stabilised musical frequency G (for example 2000 R. P. S.); the cathode ray tube A; the fixed coils B and B' and the movable coils $b$ and $b'$ the role of which is to generate the rotating straight line MM' of the cathode ray tube. The coils $bb'$ feed the grids of two amplifier valves L₁, L₂ in the plate circuits of which there are found two elevating transformers 5 and 6, the secondaries of which, in two portions, feed respectively the pairs of vertical deflecting plates 7, 7' and horizontal deflecting plates 8, 8'. When the cathode ray tube is of the magnetic deflection type (television valve, for example) the plates of the valves L₁ and L₂ deliver directly into the deflection windings. To obtain a luminous line which permits of precisely measuring the direction, there is arranged along the axis ZZ' a second goniometer C₂ (Figure 14) which comprises two fixed coils B₁, B'₁, supplied with continuous current and similar to each other. At the centre of these coils and according to the axis ZZ', two coils $b_1$ and $b_1'$ can rotate, the positions of the turns of which are at 90° with respect to one another. The potentials created in the coils $b_1$, and $b_1'$, sinusoidal and displaced in phase by $\pi/2$, relatively to one another, have their frequency exactly equal to the number of revolutions per second of the distributors D and D₁. These coils supply, through resistances 9 and 10, the solenoids 11, 11' and 12, 12' which constitute the inductor of the graduated phase transformer DEPH₁ and which are displaced 90° relatively to one another. The rotating field which arises along the symmetrical axis $\phi_1\phi_1$, creates in the coil 13 an electromotive force of the same frequency as that of the inducing current but the phase of which can vary as desired simply by the angular displacement of the coil in the field. The variation of phase is strictly equal to the variation of the angular position of the coil which means that if a signal of duration equal to the sweeping of O to M (sector $mp$ of Figure 17) can be generated, there is produced by the application of this signal on the control grid, a luminous line extending from A to M and the angular position of which is connected to the angular position, with respect to an arbitrary standard, of the induced coil 13 of the phase transformer DEPH₁. The phase transformer, which may be graduated in degrees or grades on each side of the direction corresponding to the point directly ahead serves to measure the direction, since the luminous mark or line replace the straight line AM of the scale carrying ruler I of Figure 18. This device for measuring the direction remains exact even if the position of the points M is an ellipse instead of being a circle, for the frequency of generation of the rectangular signals is strictly equal to the number of revolutions per second of the scanning line AM about A, that is to say of the Hertzian scanning about OO' (Figure 19). The valves L₃, L₄ and L₆ serve, according to the invention, to obtain a rectangular positive signal, the duration of which is a little greater than that taken by the spot to go from A to M (1/8000 of a second in the case of the example described). The valve L₃ of the pentode triode type mounted in a resistance amplifier, amplifies the potential induced in the coil 13, whilst the valve L₄ also of the pentode triode type is generator of positive and negative triangular signals according to the known process of damped self-induction, the process of which is illustrated in Figures 20a, 20b, 21, and 22. The electromotive force of the coil 13, amplified by the valve L₃ acts on the grid of the pentode of the double valve L₄ and gives rise to an impulse plate current represented by 3, 4 on Figure 20b. This current passing through the self-induction 14 damped by the resistance 15 causes the appearance of an electromotive force, the development of which is illustrated at 5, 6, 7, 8 of Figure 21 as a function of the time. The positive peaks 5, 7 of this potential, spaced apart by 1/N (N being the number of revolutions per second of the distributors) applied to the triode grid of the valve L4 produce, in the self-induction 16 inserted in the plate, a potential indicated in Figure 22 when the dampening produced by the resistance 17 is correct. The peaks 9, 10, 11, 12 of this potential have an approximately triangular shape, and it will be seen that positive current impulses are obtainable on the plate circuit of the mixing valve L6 when the oscillating grid 26 of the valve L6 is not strongly negative, and when positive impulses 9, 11 are applied to the control grid 27.

Figure 23:
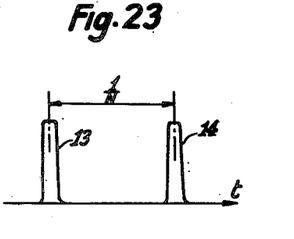
Figure 24:
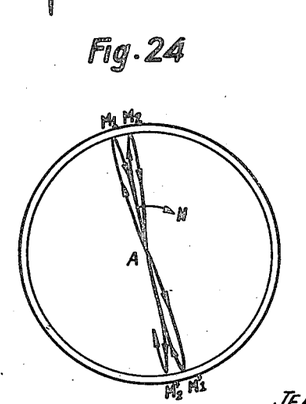
Figure 25:
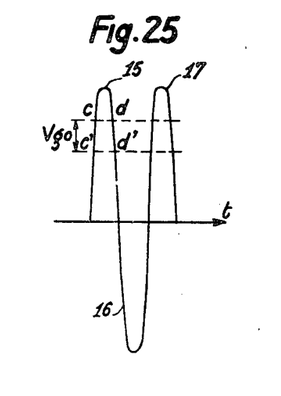
Figure 26:
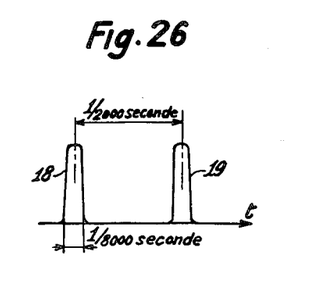

The width of the trapezoidal impulses obtained depends on the polarisation of the grid 27 of the valve L6, exactly where it is most convenient to obtain current impulses of a definite width of base. The current impulses represented by 13, 14 (Figure 23) have approximately the form of the trapezium $aba'b'$ (Figure 22), $ab$ representing approximately the blocking potential $Vgo$ of the characteristic $Ip = f(Vgo)$ of the valve L6. The positive current impulses 13, 14 (Figure 23) cause, by their passage through the resistance 28, negative impulses of potential approximately of the same form. The valve L7 transforms these negative impulses into positive impulses which are collected on the resistance 29. These impulses are transmitted to the control grid through capacities 30 and 31, the self-induction 33, the part played by which will be hereinafter set forth, and the resistance 32. Figure 24 shows how, according to the present invention, the spot sweeps the luminescent screen of the cathode ray tube; from the fact of the angular velocity the path $AM_1$ is not confused with the return path to the centre $M_1A$ and in the same way $AM_1'$ is not confused with $M_1'A$; very slender sheets are formed and it is advantageous only to illuminate the paths such as $AM_1$, $AM_2$, which alone carry the echoes. It is the triode pentode valve L5 which, receiving the potential of the generator G, amplified by the step-up transformer 20, generates trapezoidal positive impulses such as 18, 19 (Figure 26). For this, the potential applied to the grid resistance 22 is sufficiently strong to break up the plate current of the pentode element of the valve L5 (Figures 19 and 25); there result negative impulses of potential on the resistance 23 inserted in the plate of the pentode and, by the application of this potential to the grid of the triode element of the same valve positive impulses of potential on the plate resistance 24. The duration of these impulses is exactly equal to $\frac{1}{4}$ of the period of the potential produced by G by the effect of the negative polarisation of the grid of the pentode element of the valve L5 or $\frac{1}{8000}$ of a second in the present case. The variable condenser 21 and the resistance 22 (Figure 19) permit the phase advancement to be obtained necessary for the superposing of the impulses obtained on the resistance 24 with the paths $AM_1$, $AM_2$, etc., (Figure 24). The impulses thus obtained are applied to the oscillation grid 26 of the mixing valve L6, the control grid 27 of which already receives the triangular impulses collected on the self-inductance 16 inserted in the plate of the triode element of the valve L4. The result is that there only appear on the resistance 29 inserted in the plate of the valve L7 positive impulses which are only produced at a precise moment of the position of AM on the luminescent screen, this moment being fixed by the position of the coil 13 in the rotating field of the phase transformer DEPH1. There is thus obtained a luminous line having the form of $AM_1$ and the thickness of which is all the greater the longer the duration of the impulse due to the valve L4. When the impulse coming from the valve L4 is of the order of the duration of the path of the spot from A to M, the luminous line is reduced in thickness to the diameter of the spot.

It will now be seen how, according to the present invention, a circular luminous line can be obtained concentric with the pole A of the panoramic diagram and which permits the distance of the objects to be measured with precision, what ever may be the rule adopted for scanning of the element AM or the size of this element. It has been seen on the development of the movement of the spot, as illustrated in Figure 17, that only the portion $mn$ of the sinusoidal scanning has been used to receive the echoes of the objects, the corresponding time represented by $mn'$ representing for example only $\frac{1}{5}$ of the period T of the movement of the spot, this period furthermore being equal to that of the potential produced by the musical frequency generator G. Giving T the value of $\frac{1}{2000}$ of a second or the time necessary for the electromagnetic waves to travel 75 km. and back, the time $mn'$ will be $\frac{1}{10,000}$ of a second and will represent the time necessary for the waves to travel 15 m. and back. It is therefore convenient to use a triangular impulse of very short duration at the base (a few tenths of a microsecond for example) generated at intervals exactly equal to T, starting from the sinusoidal potential coming from G, and applied to the negatively polarised control grid. There is thus obtained on the scanning part $mb$ a bright spot the position of which depends upon the quantity by which the potential coming from C has beer displaced in phase before generating the impulse. This point of impact, being reproduced at each sweep, forms finally on the luminescent screen of the cathode ray tube a circular line 2 (Figure 28) concentric with the centre of the panoramic diagram. It is then sufficient to arrange a graduated phase transformer in order to obtain, by measurement of the distance of phase necessary for bringing the radius 1 of the circle from zero to a value where the circular line is a tangent to the spot B representing the echo of the object, the measure of the distance sought. The phase transformer is graduated directly in distances and arrangements are made, by a suitable preliminary displacement of phase, for the indication zero of the distance to correspond to the circle of zero radius. There will be seen on Figure 19 a capacity resistance bridge 34 intended to give a fixed displacement of phase for matching the zeros; a generator valve L8 for two equal currents, displaced in phase by $\lambda/2$, intended to supply the inductor of the graduated phase transformer DEPH2; and two multiple valves L9 and L10 of the pentode triode type, intended to generate the triangular impulse. The plate circuit of the valve L8 comprises a shock self-inductance 35, a condenser 36 and a self-inductance 37 in series with which there are placed two branches comprising one, the capacity 38, the resistance 40 and the coils 41, 41' of the graduated phase transformer DEPH2; the other, the self-inductance 39, the resistance 42 and the coils 43, 43' of the phase transformer. The self-inductance 37 and the condenser 36 are regulated in such manner that the circuit 36, 37 is in resonance on the frequency of G; the capacity 38 and the resistance 40 are such that there is obtained:

$$\frac{L'}{CW} - L'W = R$$

C being the value of the capacity 38, L' the self-inductance of the coils 41, 41' placed in series, and R the resistance 40; in the same way the self-inductance 39 and the resistance 42 are such that there is given:

$$(L'' + L''')W = R$$

Figure 27:
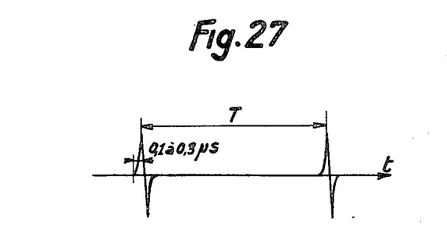

L'' being the self-inductance 39, R the resistance 42 equal to the resistance 40 and L''' the self-inductance of the coils 43, 43' identical with that of the coils 41, 41'. It will be seen that there circulates in the coils 41, 41' of the graduated phase transformer, a current displaced in phase by $\pi/4$ in advance of the current in the oscillating circuit 36, 37, and in the coils 43, 43' a current displaced in phase backwardly by $\pi/4$. The two currents are thus displaced in phase by $\pi/2$ with respect to one another and they are furthermore equal, for the two impedances of the branches 38, 40, 41, 41' and 39, 42, 43, 43' are equal. The electromotive force induced in the rotating coil 44 of the graduated phase transformer DEPH$_2$ has a phase which varies directly corresponding to the angle of the coil with respect to a fixed reference axis; it is therefore sufficient to rotate the coil 44 through an angle corresponding to the displacement in phase $mn'$, to cause the bright spot to circulate from $m$ to $M$, that is to say, to vary definitely the radius of the circular luminous mark from A to the value which corresponds to the maximum of range $mn$. The purpose of the valves L$_9$ and L$_{10}$ is to amplify the potential induced in the coil 44 and to produce, according to the known process of damped self-induction, successively sharpened potential impulses in the circuits 46, 47, 48, 49, 50, 51. Figure 27 shows the form of the impulses which, selected by the resistance 53, are applied to the control grid and cause the circular luminous mark.

Figure 28:
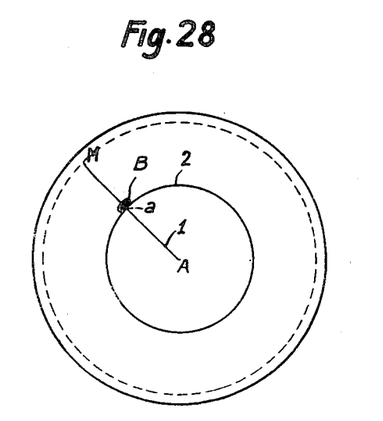

Finally, there is illustrated in Figure 28 how the luminous screen of the cathode ray tube appears when the process of the luminous marks is employed. To determine the direction and the distance of an object, the echo of which is shown at B, the luminous mark OM(1), actuated by means of the graduated phase transformer DEPH$_1$, is made to pass to the centre of the luminous spot B representing the echo of the object, whilst the circular luminous mark 2, actuated by the phase transformer DEPH$_2$, is brought to meet at a tangent the spot at its point nearest to the centre A. The direct readings made on the graduated dial of each phase transformer give instantly the distance and the direction sought.

Figure 29:
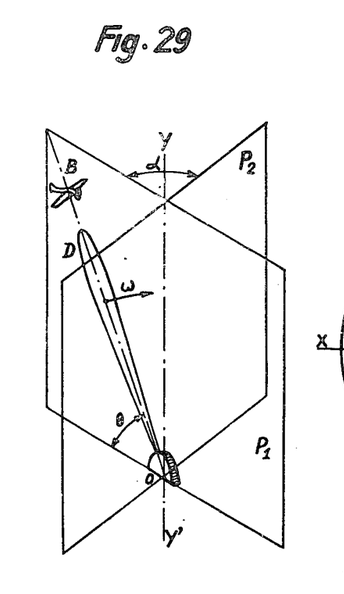
Figs. 29 and 30 show how the device according to the present invention may be used for locating flying objects.
Figures 30, 31:
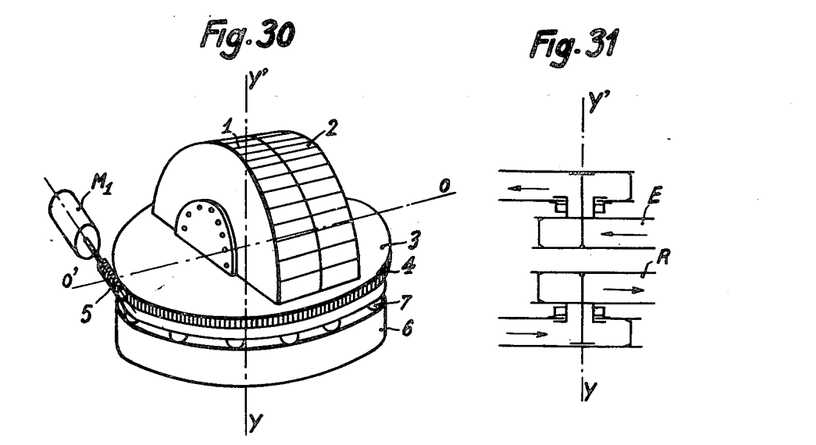
Fig. 31 is a diagrammatic view of the means for collecting and applying the echo signal picked up by the device of Fig. 30.
Figure 32:
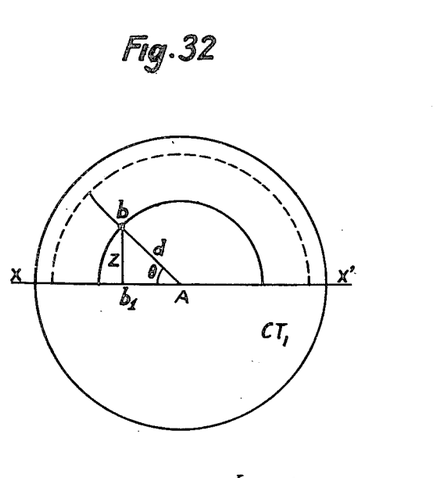
Figs. 32 to 34 show the method and means for interpreting the altitude and location of flying objects indicated by the device of Figs. 29 to 31.

The invention may also be applied to the electromagnetic detection of aeroplanes and aircraft. The divided projectors are then directed in such manner that the plane of exploration becomes vertical instead of horizontal. Figures 29 and 30 show how the search for aircraft is effected. There will be seen in Figure 30, the divided transmission and reception projectors 1 and 2, the axis OO' on which rotate the distributors identical with those of Figure 14; a rotating platform 3 operable by a motor M$_1$ through a toothed rim 4 and an endless screw 5; a supporting base 6 for the platform and the running rollers 7 of the rotating platform. There is illustrated in Figure 29 a vertical exploration plane P$_1$ over which passes the axis OD of the Hertzian beam. This beam which rotates about OO' with the speed $\omega$, projects beyond the plane P$_1$ by an equal distance to the right and left, which distance is equal to half the aperture of the beam in the plane perpendicular to the polarisation of the waves. The problem consists in causing the exploration plane to pass through the plane P$_1$ which includes the aircraft B to be detected. As the exploration in the whole surface of P$_1$ takes place automatically by the system of the P. P. I. scanning, the only search to be carried out is that of the position of the plane P$_1$ about the vertical axis YY' about which the platform rotates. The echo $b$ from the aircraft B appears on the cathode ray tube CT$_1$ (Figure 32) as soon as it is in the plane P$_1$. At this moment, there is immediately obtained by means of the phase transformers DEPH$_1$ and DEPH$_2$ the distance $d$ of the aircraft with respect to the aerials and the angle $\theta$ made by the axis of OD with the horizontal. There is immediately obtained the altitude Z by the formula:

$$Z = d \sin \theta = bb_1$$

Figure 33:
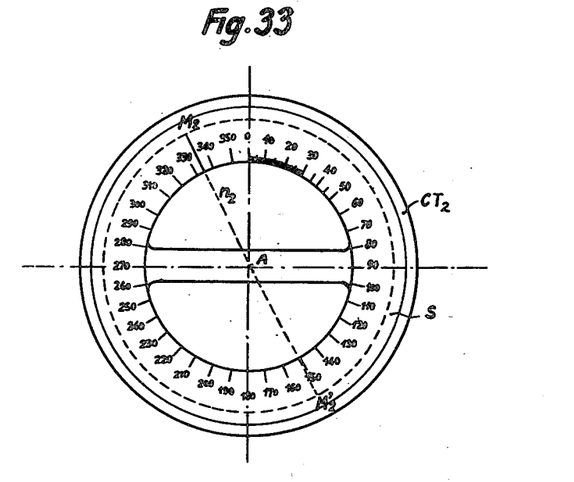

To get the azimuth of the aircraft, the installation is completed by a cathode ray tube CT$_2$ (Figure 33) and a group of circuits (Figure 34) which permit a luminous line M$_2n_2$ to be obtained on the fluorescent screen of the tube CT$_2$ which forms a datum mark rotating about A and which permits the azimuth sought by direct reading on the transparent sector S graduated from 0 to 360° to be obtained immediately. The position of M$_2n_2$ exactly reproduces the position of the straight line representing the intersection of the vertical plane P$_1$ in which occurs the exploration by the rotating Hertzian beam and of a horizontal plane passing through the axis about which rotates the directional diagram of the aerials.

Figure 34:
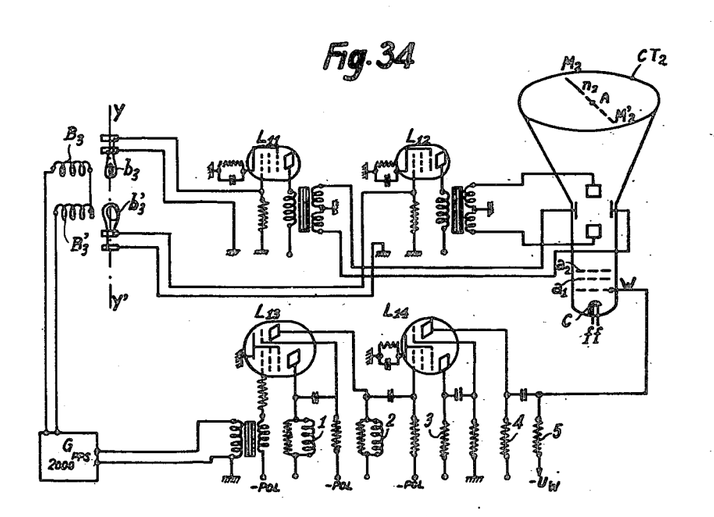

The luminous sector M$_2n_2$ is obtained by means of circuits which are illustrated in Figure 34; there is illustrated a generator B$_3$, B'$_3$, $b_3$, $b'_3$ of two potentials sinusoidal at the frequency of G and the amplitudes of which correspond to the angle made by the two coils $b_3$, $b'_3$ with the axis of the coils B$_3$, B'$_3$. This system is the same as that which has been previously described and which allows the rotating straight line M$_2$, M$_2$' (Figure 19) to be obtained. The coils $b_3$, $b'_3$ are mounted on the vertical axis YY' of the rotating platform (Figure 30). The potentials which they produce by reason of the action of the alternating fields of B$_3$ and B$_3$' supply two valves L$_{11}$, L$_{12}$ in the plate circuits of which are inserted the lifting transformers, the secondaries of which, in two parts, feed respectively the horizontal and vertical deflecting plates of the tube CT$_2$. The result is that the straight line M$_2$, M$_2$' (Figure 33) rotates by the same amount as the rotating platform, that is to say, as the plane of exploration. In order to cause the appearance of only one segment M$_2n_2$ of the straight line M$_2$M$_2$', the control grid is polarised negatively and is fed by a positive rectangular impulse of a duration equal to M$_2n_2$ and which is reproduced with each period of the generator. The valves L$_{13}$ and L$_{14}$ permit triangular impulses to be obtained respectively on the dampened self-inductions 1 and 2 (Figure 34) and negative rectangular impulses on the resistance 3 and positive rectangular impulses on the resistance 4. The control grid $CT_2$ is fed through a highly insulated condenser and a resistance 5. The size of $M_2n_2$ is obtained by polarisation action of the valve $L_{14}$, whilst its phase is regulated by the polarisation of the valve $L_{13}$, according to the known process of displacement on the sinusoidal potential emanating from G of the two points of release and of saturation of the characteristic of the pentode element of the valve $L_{13}$. When the exploration plane only rotates through 180°, the transmitter and the receiver are generally separated from the aerials and it is advisable to feed these through rotating joints of which Figure 31 illustrates an example. The principle is identical with that used for the passage of the energy from the guides to the distributors, as has been previously described (Figures 12 and 13). When the apparatus is intended for permanent exploration, it should be able to effect a continuous rotating movement and the casings or chests containing the different transmission and reception members are then mounted in a turret which is supported by the rotating platform 3 (Figure 30). The rotating joints shown in Figure 31 then become unnecessary, as also the sliding contacts which it was indispensable to provide for supplying the members measuring the direction and distance located outside the platform.

If necessary two projector apparatuses according to the invention could be associated, one of the panoramic horizontal type first described and the other of the vertical type as has just been described. The first will serve to inspect permanently the horizon up to a certain height determined by the vertical field of the horns; the other will serve for the precise determination of the elements of an aircraft or particular group of aircraft. The fundamental elements of supply and of scanning may be common to the two apparatuses.

The invention is naturally not restricted to the particular embodiments which have been described by way of example, but is intended to embrace all equivalent modifications which an expert skilled in the art could substitute and which are capable of ensuring the same functions.

What I claim is:

1. A device for transmitting a directed ultra-high frequency electro-magnetic wave rotating to scan the surrounding space and comprising: a plurality of fixed, frusto-conical horns having their lateral walls juxtaposed and arranged in a common plane around a central point, the major ends being directed outwardly and the minor ends inwardly; a guide rotating in said plane and having an opening facing said minor ends; and means for supplying ultra-high frequency energy to said guide.

2. A device for transmitting a directed ultra-high frequency electro-magnetic wave to which rotational movement is imparted to scan the surrounding space and comprising: a plurality of fixed, pyramidal horns of rectangular cross-section having their major lateral walls juxtaposed and arranged radially around a common geometrical axis, each horn having a large opening directed outwardly and a small opening directed inwardly, a guide of rectangular cross-section rotating upon said axis in the plane of the horns and having an opening facing the small openings thereof; and means for supplying ultra-high frequency energy to said guide.

3. A device for transmitting a directed ultra-high frequency electro-magnetic wave to which rotational movement is imparted to scan the surrounding space and comprising: a plurality of fixed, pyramidal horns of rectangular cross-section having their major lateral walls juxtaposed and arranged radially around a common geometrical axis, each horn having a large opening directed outwardly and a small opening directed inwardly; a guide of rectangular cross-section rotating upon said axis in the plane of the horns, the guide being closed at one end by a piston and open at the other end, said other end being adjacent the small openings of the horns and of a size to cover a plurality thereof; and means for supplying ultra-short waves of the $TE_{01}$ type to said guide.

4. In apparatus for panoramic radio-electric exploration of space in a horizontal plane: a series of fixed transmitting horns of rectangular cross-section having their lateral walls juxtaposed, and arranged in a horizontal plane to form a circular crown bounded by an outer cylindrical surface constituted by the large openings of the horns and an inner cylindrical surface constituted by the small openings thereof; a rectangular hollow guide located inside the space defined by the inner cylindrical surface and situated in the plane of the crown, said guide being closed at one end by a piston, and having at the other end a rectangular opening covering a plurality of small openings of the horns and located adjacent thereto; means for rotating the guide upon the axis of the crown; and means for supplying ultra-short waves of the $TE_{01}$ type of the guide.

5. In apparatus according to claim 4: a series of fixed receiving horns having the same configuration as the series of transmitting horns and arranged co-axially therewith in a parallel plane; a rotating hollow guide situated in said parallel plane and rotatable with the first guide at a slight angle thereto relatively to the axis of rotation; and means connecting the second guide to an echo-receiving device.

6. In radio-location apparatus, more particularly for spotting flying targets, a series of pyramidal transmitting horns of rectangular cross-section having their lateral walls juxtaposed and arranged radially in a vertical plane around a common geometrical axis, a rectangular hollow guide closed at one end and open at the other end adjacent the small ends of the horns, the open end of the guide covering a plurality of horn openings, means for rotating the guide about the axis of the horns to sweep all the horns successively, means for supplying ultra-high frequency energy to the guide, a horizontal platform supporting the horns, and means for rotating the platform about its vertical axis.

7. In apparatus according to claim 6, a series of receiving horns having the same configuration as the series of transmitting horns, arranged radially in a plane parallel to the plane of the first series, and supported on the same platform, a hollow guide rotating in the plane of the second series, having an opening adjacent the small ends of the horns thereof, and rigidly connected to the means for rotating the first guide, and means for connecting the second guide to an echo-receiving device.

8. In a space distributor of ultra high frequency energy, a plurality of fixed distribution channels comprising hollow tubular wave guides arranged circularly around an axis, each comprising an entrance-opening facing said axis, a single hollow channel closed at one end and opened at its other end located in the plane of said plurality of channels and situated so as to revolve around this axis and to sweep with its opened end the entrance of said channels, means to supply this single channel with ultra high frequency energy and means to impress on it a continuous revolving movement.

9. In a distributor according to claim 8, a radiating means positioned at the end of each distributing channel.

10. In a distributor according to claim 8, the guides and said single channel being of rectangular cross section.

11. Distributor of ultra high frequency energy, comprising in combination, a plurality of fixed distribution channels comprising hollow tubular wave guides arranged circularly around an axis, each comprising an entrance opening facing said axis, a cavity resonator located in the plane of these channels and revolving around said axis, the end of this resonator opposite said channel entrances closed by a wall comprising a radiating slot extending parallel to said revolution axis, means to supply this cavity resonator with ultra high frequency energy, and means to impress on it a continuous revolving movement.

12. Distributor according to claim 11, wherein the said supply means comprise a fixed wave guide fed with ultra high frequency energy, a coaxial feeder fixed on the one end to the said resonator and coupled electromagnetically on its other end to said guide, and a rotational bearing supporting said resonator and coaxial.

JEAN JACQUES HUGON.

REFERENCES CITED

The following references are of record in the file of this patent:

UNITED STATES PATENTS

| Number | Name | Date |
|---|---|---|
| 2,130,912 | Tolson | Sept. 20, 1938 |
| 2,231,929 | Lyman | Feb. 18, 1941 |
| 2,206,883 | Wolff | July 2, 1940 |
| 2,209,191 | Dearing | July 23, 1940 |
| 2,343,306 | Lear | Mar. 7, 1944 |
| 2,343,531 | Buchholz | Mar. 7, 1944 |
| 2,369,808 | Southworth | Feb. 20, 1945 |
| 2,400,641 | Hardy | May 21, 1946 |
| 2,400,791 | Tolson | May 21, 1946 |
| 2,403,278 | Hershberger | July 2, 1946 |
| 2,406,858 | Shepherd | Sept. 3, 1946 |
| 2,408,848 | Hammond | Oct. 8, 1946 |
| 2,409,456 | Tolson | Oct. 15, 1946 |
| 2,429,809 | Fyler | Oct. 28, 1947 |
| 2,438,947 | Rieke | Apr. 6, 1948 |
| 2,460,401 | Southworth | Feb. 1, 1949 |

FOREIGN PATENTS

| Number | Country | Date |
|---|---|---|
| 455,765 | Great Britain | Oct. 27, 1936 |
| 108,556 | Australia | Sept. 28, 1939 |